US011263518B2

(12) United States Patent
Venkataramani et al.

(10) Patent No.: US 11,263,518 B2
(45) Date of Patent: Mar. 1, 2022

(54) BI-SCALED DEEP NEURAL NETWORKS

(71) Applicant: INTERNATIONAL BUSINESS MACHINES CORPORATION, Armonk, NY (US)

(72) Inventors: Swagath Venkataramani, Yonkers, NY (US); Shubham Jain, West Lafayette, IN (US); Vijayalakshmi Srinivasan, New York, NY (US); Leland Chang, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 315 days.

(21) Appl. No.: 16/593,284

(22) Filed: Oct. 4, 2019

(65) Prior Publication Data

US 2021/0103799 A1 Apr. 8, 2021

(51) Int. Cl.
*G06N 3/04* (2006.01)
*G06N 3/063* (2006.01)

(52) U.S. Cl.
CPC .......... *G06N 3/0481* (2013.01); *G06N 3/063* (2013.01)

(58) Field of Classification Search
CPC .............................. G06N 3/0481; G06N 3/063
USPC .......................................................... 706/15
See application file for complete search history.

(56) References Cited

U.S. PATENT DOCUMENTS

| 8,346,692 B2* | 1/2013 | Rouat | G06K 9/6212 |
| | | | 706/20 |
| 2004/0252870 A1* | 12/2004 | Reeves | G06T 7/0012 |
| | | | 382/128 |

| 2016/0328646 A1 | 11/2016 | Lin et al. |
| 2018/0107451 A1 | 4/2018 | Harrer et al. |
| 2018/0197081 A1 | 7/2018 | Ji et al. |

(Continued)

FOREIGN PATENT DOCUMENTS

| CN | 107292458 A | 10/2017 |
| CN | 109102064 A | 12/2018 |
| WO | WO2019033380 A1 | 2/2019 |

OTHER PUBLICATIONS

He, et al., "Effective Quantization Methods for Recurrent Neural Networks", arXiv:1611.10176v1 [cs.LG] Nov. 30, 2016 (Year: 2016).*

(Continued)

*Primary Examiner* — Tsu-Chang Lee
(74) *Attorney, Agent, or Firm* — Tutunjian & Bitetto, P.C.; Stosch Sabo

(57) ABSTRACT

A method is provided for forming a Deep Neural Network (DNN). The method includes quantizing deep learning data structures of the DNN into at least two modes using at least two scale factors, respectively. Each of the at least two modes corresponds to a respective one of the at least two scale factors. The method further includes identifying which of the at least two scale factors to use for a given one of the data structures based on a data distribution of the given one of the data structures. The quantizing step includes identifying when a tail of the given one of the data structures starts by (i) building a histogram of values in the given one of the data structures using successive bins; (ii) identifying a ratio of density between the successive bins; and (iii) checking whether the ratio of density is greater than a ratio of density threshold.

11 Claims, 12 Drawing Sheets

(56) References Cited

U.S. PATENT DOCUMENTS

| | | |
|---|---|---|
| 2018/0322382 A1 | 11/2018 | Mellempudi et al. |
| 2018/0322391 A1 | 11/2018 | Wu et al. |
| 2019/0012559 A1 | 1/2019 | Desappan et al. |
| 2019/0042939 A1 | 2/2019 | Langhammer et al. |

OTHER PUBLICATIONS

Zhang, et al., "LQ-Nets: Learned Quantization for Highly Accurate and Compact Deep Neural Networks", ECCV 2018 (Year: 2018).*

International Search Report dated Jan. 15, 2021 for International Application No. PCT/IB2020/058983.

Jain et al., "BiScaled-DNN: Quantizing Long-tailed Datastructures with Two Scale Factors for Deep Neural Networks", DAC '19, Jun. 2019, 6 pages.

Courbariaux et al., "Training Deep Neural Networks With Low Precision Multiplications", Accepted as a workshop contribution at ICLR 2015, arXiv:1412.7024v5 [cs.LG] Sep. 23, 2015, pp. 1-10.

Deng et al., "Reduced-Precision Memory Value Approximation for Deep Learning", Hewlett Packard Labs, Dec. 2015, pp. 1-9.

Gupta et al., "Deep Learning with Limited Numerical Precision", arXiv:1502.02551v1 [cs.LG] Feb. 9, 2015, pp. 1-10.

Gysel et al., "Hardware-Oriented Approximation of Convolutional Neural Networks", arXiv:1604.03168v3 [cs.CV] Oct. 20, 2016, pp. 1-8.

Judd et al., "Reduced-Precision Strategies for Bounded Memory in Deep Neural Nets", arXiv:1511.05236v4 [cs.LG] Jan. 8, 2016, pp. 1-12.

Judd et al., "Proteus: Exploiting Numerical Precision Variability in Deep Neural Networks" Proceedings of the 2016 International Conference on Supercomputing , Jun. 2016, 6 pages.

Lai et al., "Deep Convolutional Neural Network Inference with Floating-point Weights and Fixed-point Activations", arXiv:1703.03073v1 [cs LG] Mar. 8, 2017, 10 pages.

Lin et al., "Overcoming Challenges in Fixed Point Training of Deep Convolutional Networks", arXiv:1607.02241v1 [cs. LG] Jul. 8, 2016, 5 pages.

Mellempudi et al., "Mixed Low-precision Deep Learning Inference using Dynamic Fixed Point", arXiv:1701.08978v2 [cs.LG] Feb. 1, 2017, 6 pages.

Narang et al., "Mixed Precision Training", arXiv:1710.03740v3 [cs.AI] Feb. 15, 2018, pp. 1-12.

Svyatkovskiy et al., "Training distributed deep recurrent neural networks with mixed precision on GPU clusters", MLHPC 2017, Nov. 2017, 8 pages.

Venkataramani et al., "AxNN: Energy-Efficient Neuromorphic Systems using Approximate Computing", ISLPED'14,, Aug. 2014, pp. 27-32.

* cited by examiner

BI-SCALED DEEP NEURAL NETWORKS

BACKGROUND

The present invention generally relates to artificial learning, and more particularly to bi-scaled Deep Neural Networks (DNNs). DNNS are used in recognition problems involving images, video, text, and natural language. However, their large-scale structure and the amount of data they process impose significant efficiency and computational challenges.

SUMMARY

According to an aspect of the present invention, a computer-implemented method is provided for forming a Deep Neural Network (DNN). The method includes quantizing, by a hardware processor, deep learning data structures of the DNN into at least two modes using at least two scale factors, respectively. Each of the at least two modes corresponds to a respective one of the at least two scale factors. The method further includes identifying, by the hardware processor, which of the at least two scale factors to use for a given one of the data structures based on a data distribution of the given one of the data structures. The quantizing step includes identifying when a tail of the given one of the data structures starts by (i) building a histogram of values in the given one of the data structures using successive bins; (ii) identifying a ratio of density between the successive bins; and (iii) checking whether the ratio of density is greater than a ratio of density threshold.

According to another aspect of the present invention, a computer program product is provided for forming a Deep Neural Network (DNN). The computer program product includes a non-transitory computer readable storage medium having program instructions embodied therewith. The program instructions are executable by a computer to cause the computer to perform a method. The method includes quantizing, by a hardware processor of the computer, deep learning data structures of the DNN into at least two modes using at least two scale factors, respectively. Each of the at least two modes corresponds to a respective one of the at least two scale factors. The method further includes identifying, by the hardware processor, which of the at least two scale factors to use for a given one of the data structures based on a data distribution of the given one of the data structures. The quantizing step includes identifying when a tail of the given one of the data structures starts by (i) building a histogram of values in the given one of the data structures using successive bins; (ii) identifying a ratio of density between the successive bins; and (iii) checking whether the ratio of density is greater than a ratio of density threshold.

According to yet another aspect of the present invention, a multiscale processing element is provided for generating a Deep Neural Network (DNN). The multiscale processing element includes a multiplier for multiplying deep learning data structures by at least two scale factors corresponding to at least two modes, respectively. Each of the at least two modes corresponds to a respective one of the at least two scale factors. The multiscale processing element further includes bi-scale correction logic, operatively coupled to the multiplier, for correcting a resolution of an output of the multiplier responsive to any operands of the output of the multiplier being quantized in a particular one of the at least two modes providing enhanced resolution relative to remaining ones of the at least two modes providing enhanced range. The multiscale processing element also includes an adder, operatively coupled to the bi-scale correction logic. The multiscale processing element additionally includes an accumulation register, operatively coupled to the adder, for storing a partial sum across multiple correction cycles based on an output of the adder. The adder adds the output from the bi-scale correction logic and an output of the accumulation register to obtain the partial sum. The multiscale processing element further includes a conversion unit for converting the partial sum stored in the accumulation register into a representation corresponding a selected one of the at least two modes.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
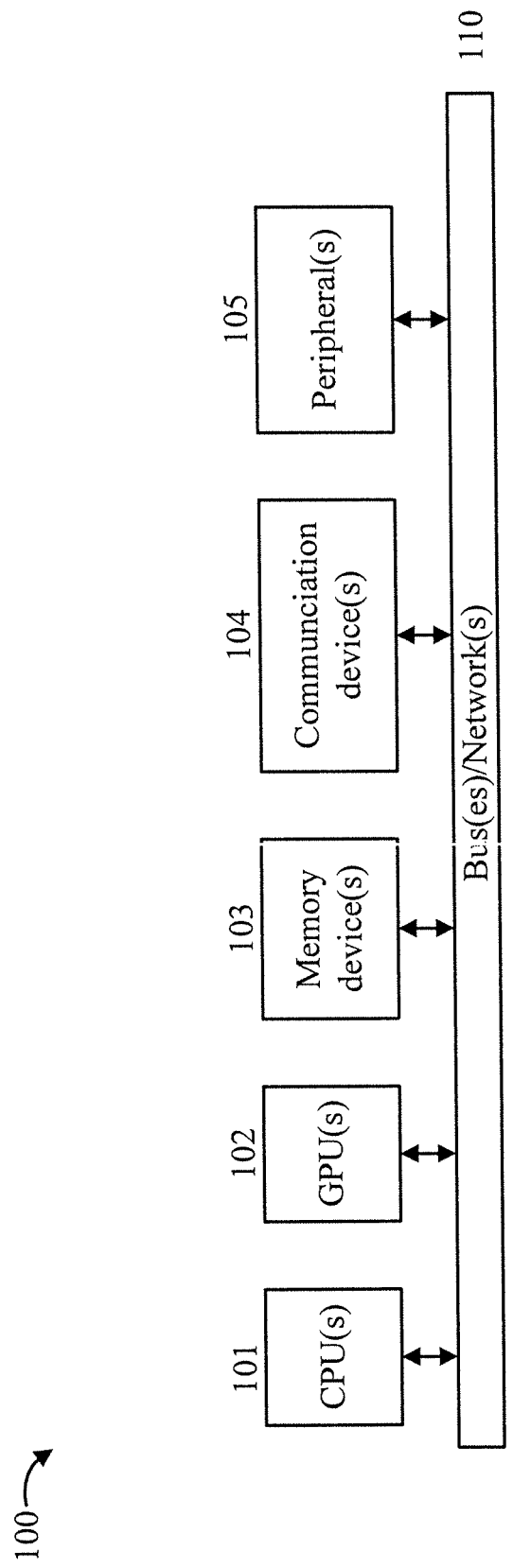
FIG. 1 is a block diagram showing an exemplary processing system, in accordance with an embodiment of the present invention.

Embodiments of the present invention are directed to bi-scaled Deep Neural Networks (DNNs).

As used herein, the term "bi-scale representation" means representing numbers using the following two modes: (i) more range for larger numbers; and (ii) higher resolution for smaller numbers. Also as used herein, the term ultra-low bit width refers to up to eight bits.

Embodiments of the present invention provide mechanisms to provide a superior tradeoff between range and resolution for low-precision DNNs by exploiting long-tailed data structures. As used herein, the term "long-tailed data structure" refers to the portion of a distribution having a large number of occurrences far from the "head" or central part of the distribution. In an embodiment, the long-tailed data structure can be determined by having a number of digits greater than a threshold amount. In an embodiment, the long-tailed data structure can be determined by having a number of digits, in addition to and from the "head" or central part of the distribution, greater than a threshold amount. In the latter case, the "head" part can be considered to include another threshold amount in order to determine where the head precisely ends and the tail precisely begins. For example, X bits can be considered the head of a distribution and any bits in addition to the X bits can be considered as the tail of the distribution. In an embodiment, two scale factors are proposed to provide more range for larger values and higher resolution for smaller values, so as to enable low-precision DNNs with substantially higher accuracy. In other embodiments, more than two scale factors can be used, as readily determined from by one of ordinary skill in the art given the teachings of the present invention provided herein.

In an embodiment, a bi-scaled DNN is provided that quantizes the long-tailed data structure in DNNs using two scale factors. Toward this end, mechanisms are provided to quantize a DNN data structure using two scale factors, to enable representation of large values with a higher range and enable representation of low values with a higher resolution, as compared to one-scale factor solutions. In an embodiment, the DNN data structures include weights and activations (features). In an embodiment, a positive weight can reflect an excitatory connection, while a negative weight can reflect an inhibitory connection. All inputs are modified by a weight and summed. This activity is referred as a linear combination. An activation function controls the amplitude of the output.

Thus, the present invention provides a superior tradeoff between range and resolution to enable higher accuracy, low-precision DNNs.

In an embodiment, low-overhead schemes are also provided to realize a bi-scaled DNN in hardware.

Embodiments of the present invention can leverage a key insight that almost all data structures in DNNs are long-tailed i.e., a significant majority of the elements are small in magnitude, with a small fraction being orders of magnitude larger. We propose BISCALED-FXP, a new number representation which caters to the disparate range and resolution needs of long-tailed data-structures. The key idea is, whilst using the same number of bits to represent elements of both large and small magnitude, we employ two different scale factors, namely scale-fine and scale-wide in their quantization. Scale-fine allocates more fractional bits providing resolution for small numbers, while scale-wide favors covering the entire range of large numbers albeit at a coarser resolution.

One or more embodiments of the present invention provide a BiScaled DNN accelerator which computes on BISCALED-FXP tensors. A key challenge is to store the scale factor used in quantizing each element as computations that use operands quantized with different scale-factors need to scale their result. To minimize this overhead, one or more embodiments of the present invention can use a block sparse format to store only the indices of scale-wide elements, which are few in number. Also, one or more embodiments of the present invention enhance the BISCALED-FXP processing elements with shifters to scale their output when operands to computations use different scale-factors.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs. These and other variations of a hardware processor subsystem are also contemplated in accordance with embodiments of the present invention.

Figure 2:
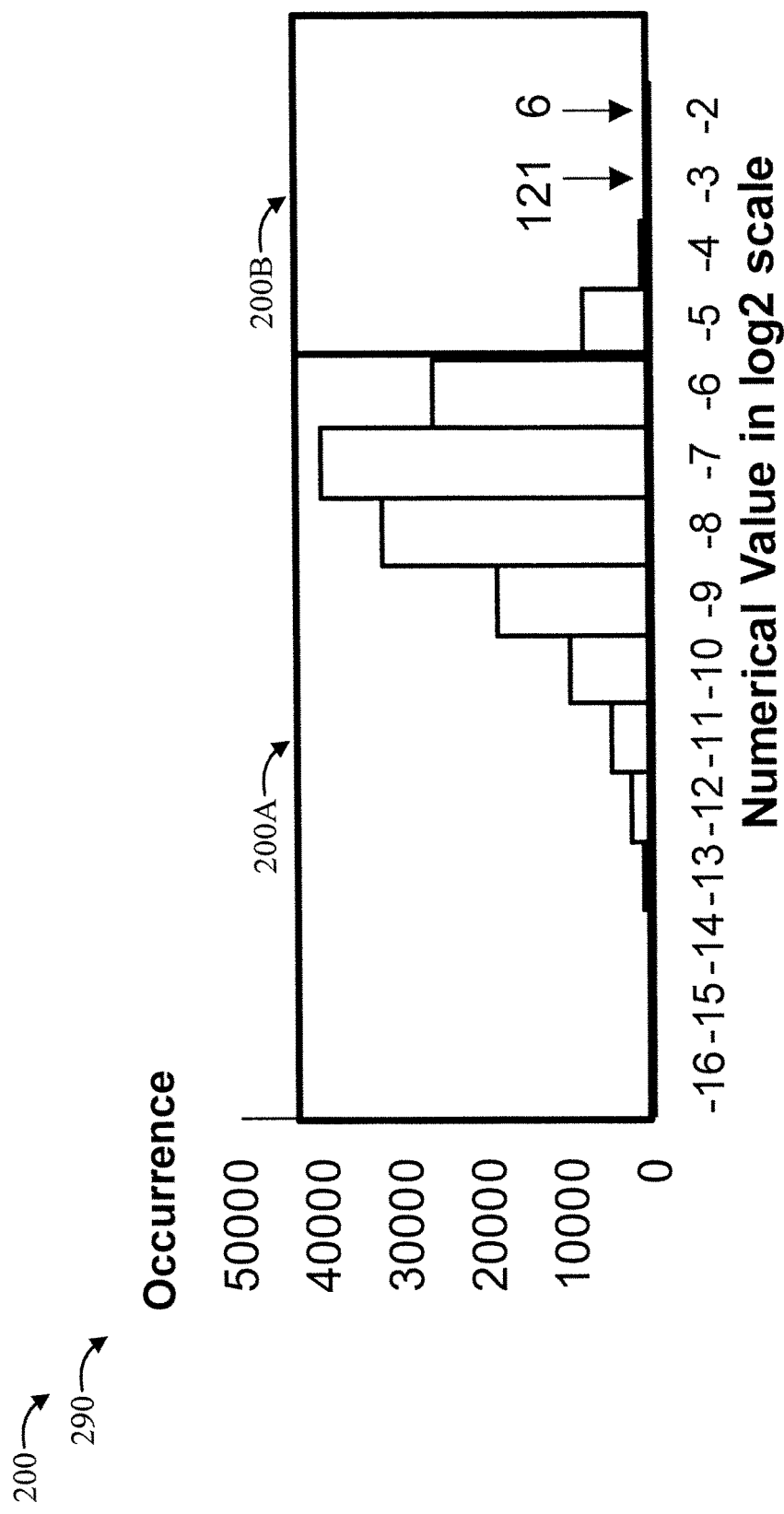
FIG. 2 is a diagram showing an exemplary long-tailed data structure, in accordance with an embodiment of the present invention.

FIG. 2 is a diagram showing an exemplary long-tailed data structure 200, in accordance with an embodiment of the present invention.

The long-tailed data structure 200 is shown in a plot 290 having "numerical value" in log 2 scale for the x-axis and "occurrence" for the y-axis.

As is evident, the portion 200A on the left shows that most numbers require lesser range, while portion 200B on the right side shows that very few numbers require a large range. The present invention can provide a superior range and resolution trade-off using two mode number representations as described herein.

Figure 3:
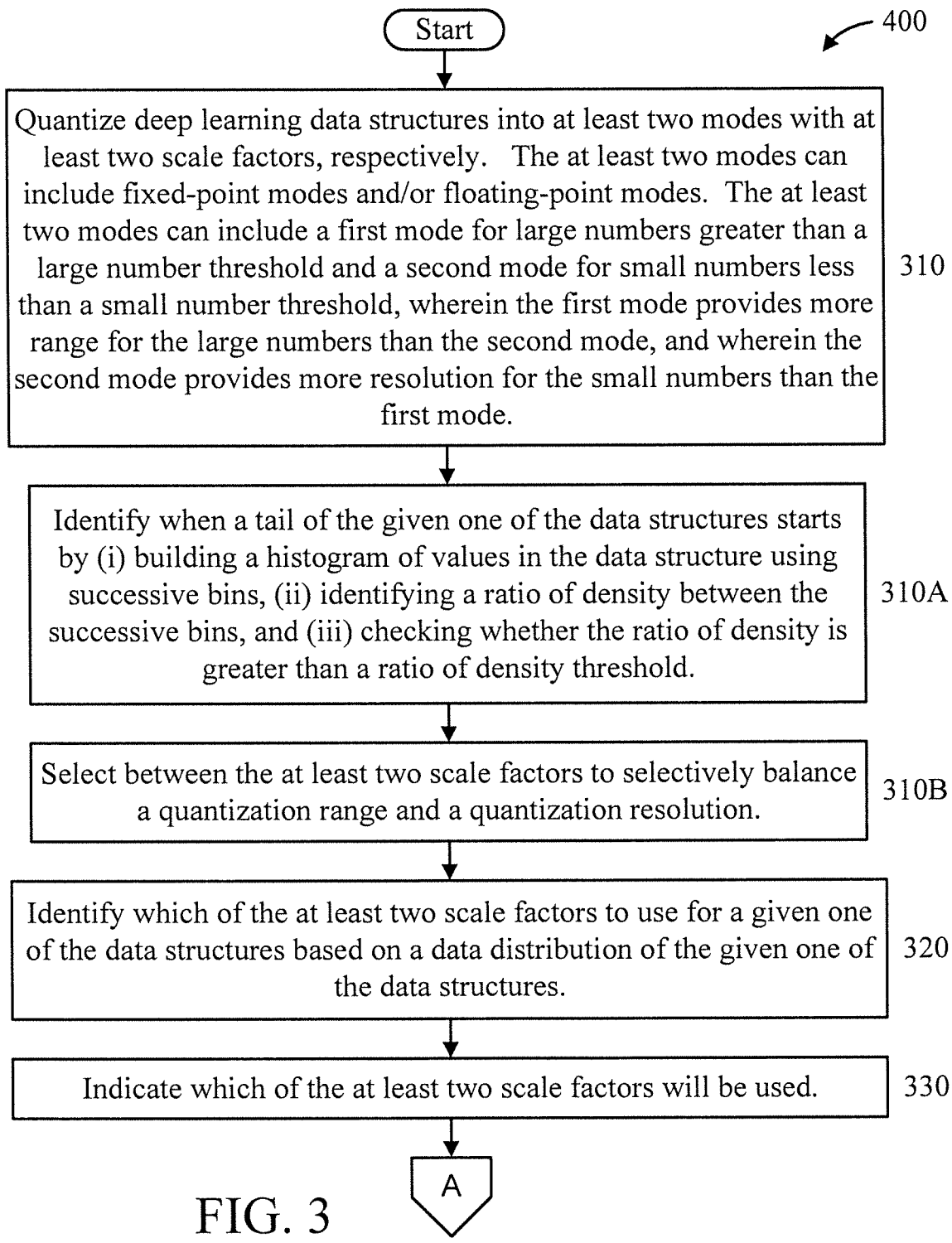
FIGS. 3-4 are flow diagrams showing an exemplary method for forming bi-scaled Deep Neural Networks (DNNs), in accordance with an embodiment of the present invention.
Figure 4:
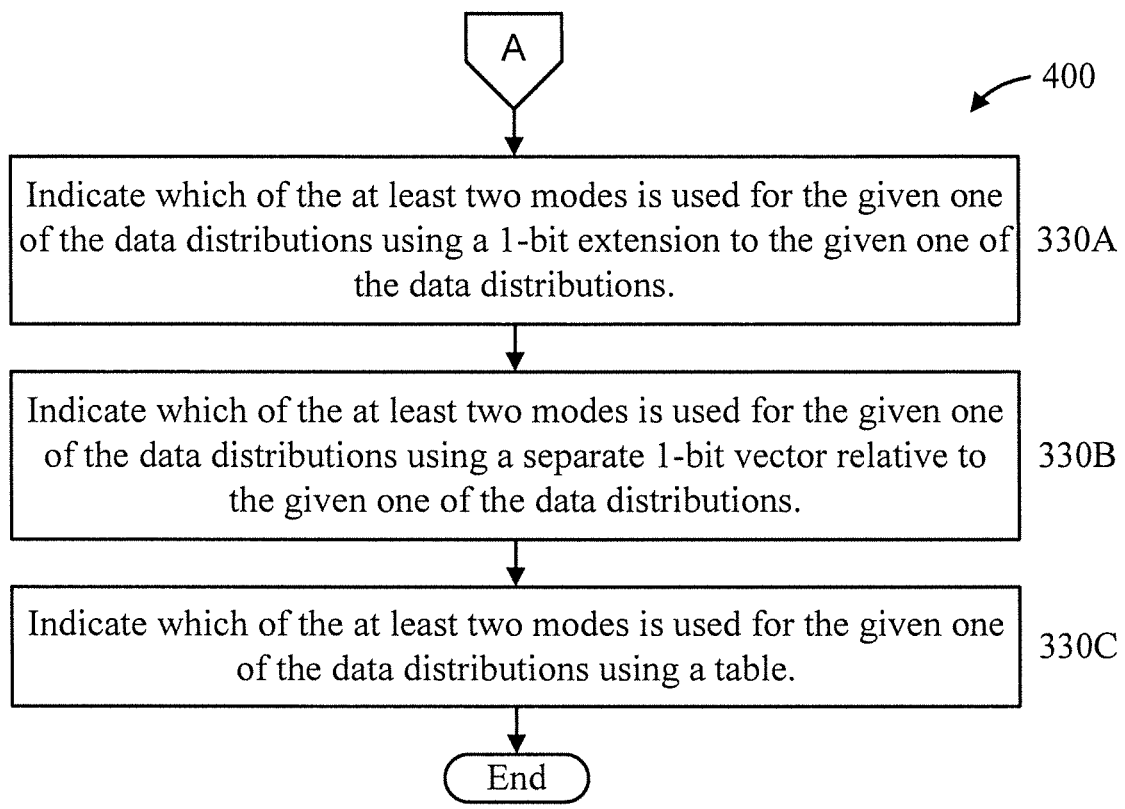

Given a Word Length (WL) constraint of 8 bits max, the following applies:
Choice 1 (Prefer Range)
 Format=[-2, 9]
 Range=[$2^{-2}$, $2^{-2}$], Saturation point=$2^{-2}$
 Max quantization error=$2^{-10}$
Choice 2 (Prefer Resolution)
 Format [-4, 11]
 Range=[2-4, 2-4], Saturation point=$2^{-4}$
 Max quantization error=$2^{-12}$ FIGS. 3-4 are flow diagrams showing an exemplary method 300 for forming bi-scaled Deep Neural Networks (DNNs), in accordance with an embodiment of the present invention.

At block 310, quantize deep learning data structures into at least two modes with at least two scale factors, respectively. The at least two modes can include fixed-point modes and/or floating-point modes. The at least two modes can include a first mode for large numbers greater than a large number threshold and a second mode for small numbers less than a small number threshold, wherein the first mode provides more range for the large numbers than the second mode, and wherein the second mode provides more resolution for the small numbers than the first mode. In an embodiment, the deep learning data structures include weights and activations.

In an embodiment, block 310 can include one or more of blocks 310A and 310B.

At block 310A, identify when a tail of the given one of the data structures starts by (i) building a histogram of values in the data structure using successive bins, (ii) identifying a ratio of density between the successive bins, and (iii) checking whether the ratio of density is greater than a ratio of density threshold.

At block 310B, select between the at least two scale factors to selectively balance a quantization range and a quantization resolution.

At block 320, identify which of the at least two scale factors to use for a given one of the data structures based on a data distribution of the given one of the data structures.

At block 330, indicate which of the at least two scale factors will be used.

In an embodiment, block 330 includes one or more of blocks 330A through 330C.

At block 330A, indicate which of the at least two modes is used for the given one of the data distributions using a 1-bit extension to the given one of the data distributions.

At block 330B, indicate which of the at least two modes is used for the given one of the data distributions using a separate 1-bit vector relative to the given one of the data distributions.

At block 330C, indicate which of the at least two modes is used for the given one of the data distributions using a table.

A description will now be given regarding 3 exemplary methods for mode selection relative to FIGS. 5, 6, and 7, in accordance with various embodiments of the present invention. The 3 exemplary methods can be used to select between two ranges, for example, corresponding to respective preferences for range or resolution.

Figure 5:
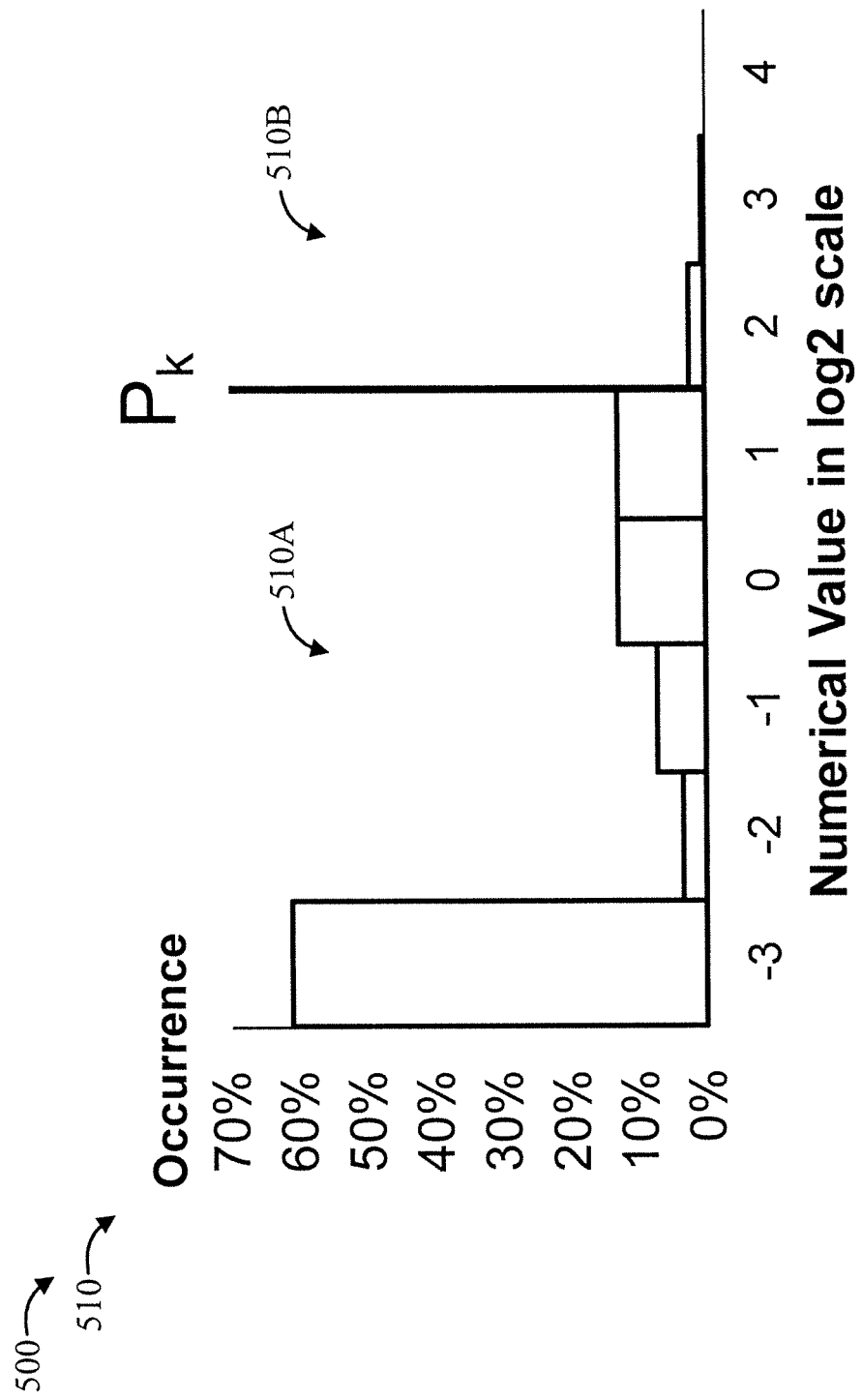
FIG. 5 is a diagram showing an exemplary percentage rule that can be applied to a data distribution, in accordance with an embodiment of the present invention.

FIG. 5 is a diagram showing an exemplary percentage rule 500 that can be applied to a data distribution 510, in accordance with an embodiment of the present invention.

The percentage rule 500 involves the following:
$P_k$=$K^{th}$ Percentile
y<$P_k$ (Low Range Mode)
y>$P_k$ (High Range Mode)
Typically, $P_k$>95%.

Thus, in the data distribution 510, portion 510A corresponds to the low range mode, and portion 510B corresponds to the high range mode.

Figure 6:
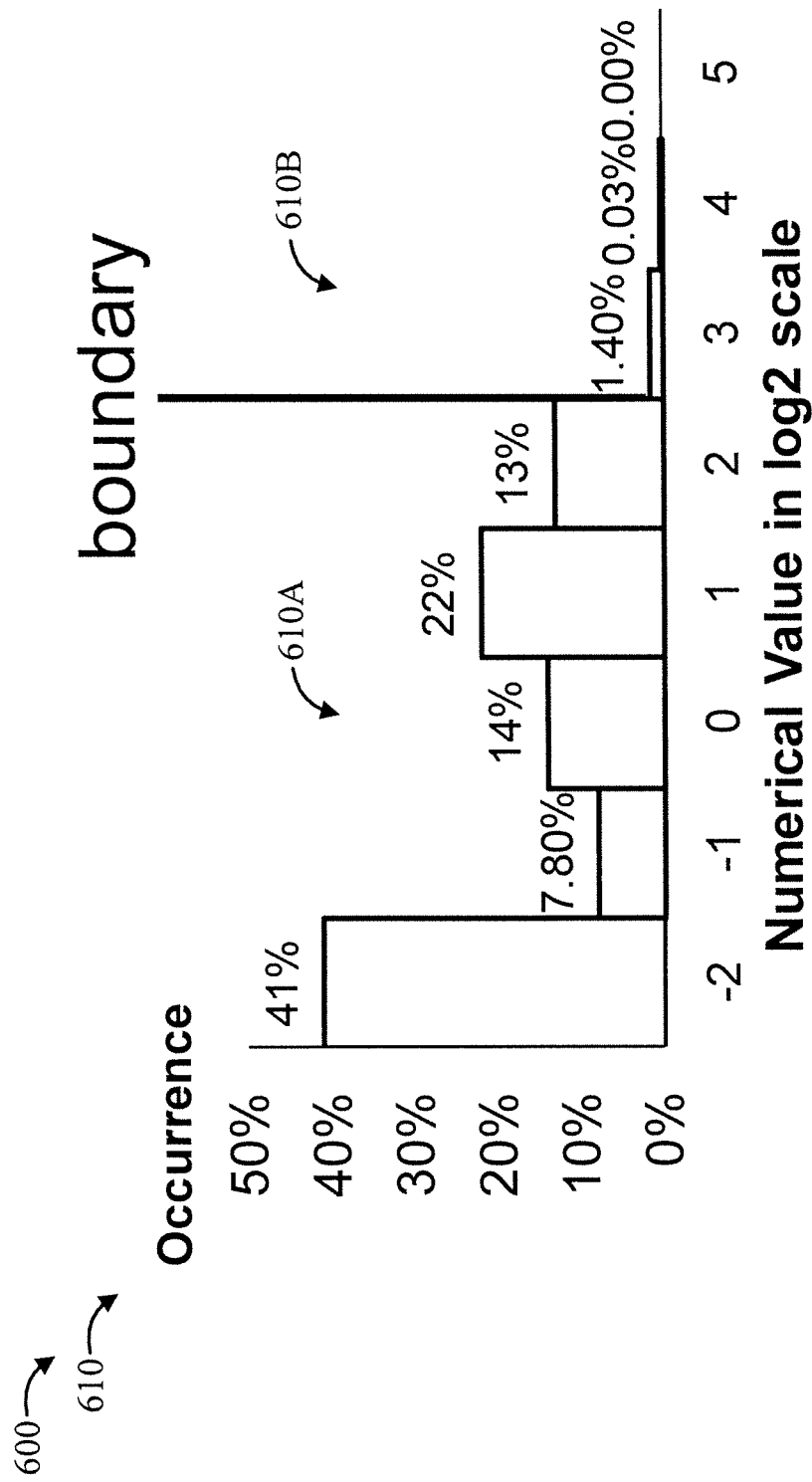
FIG. 6 is a diagram showing an exemplary ratio rule that can be applied to a data distribution, in accordance with an embodiment of the present invention.

FIG. 6 is a diagram showing an exemplary ratio rule 600 that can be applied to a data distribution 610, in accordance with an embodiment of the present invention.

The ratio rule involves the following:

$$\text{Let } \Delta_k = \frac{y_k}{y_{k+1}}$$

For k: FB to IB
if $\Delta_k$>Ø(boundary=k)
y<boundary (low range mode)
y>boundary (high range mode)
Typically, Ø~10.

Thus, in the data distribution 610, portion 610A corresponds to the low range mode, and portion 610B corresponds to the high range mode.

Figure 7:
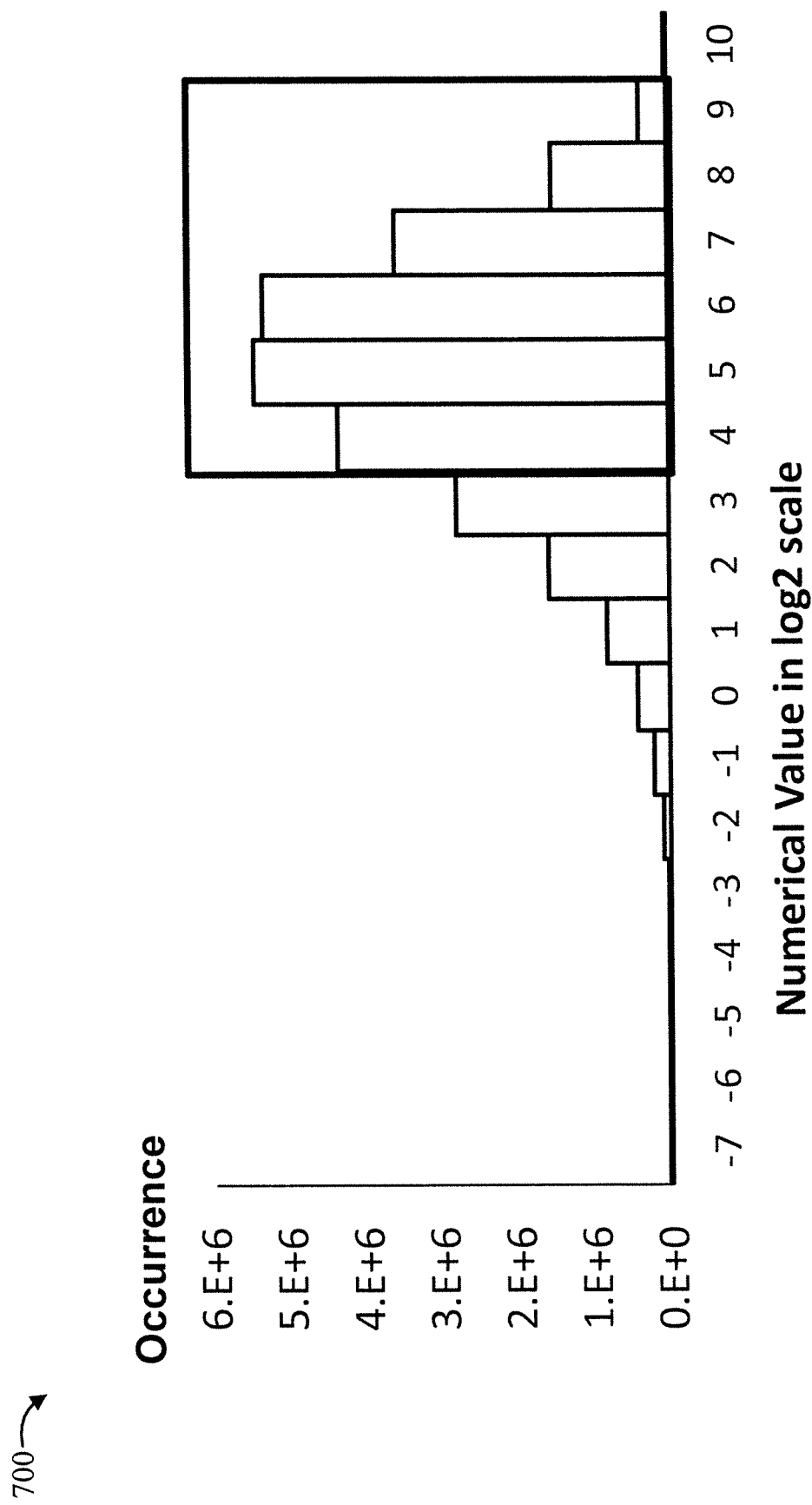
FIG. 7 is a diagram showing an exemplary distribution to which the present invention can be applied, in accordance with an embodiment of the present invention.
Figure 8:
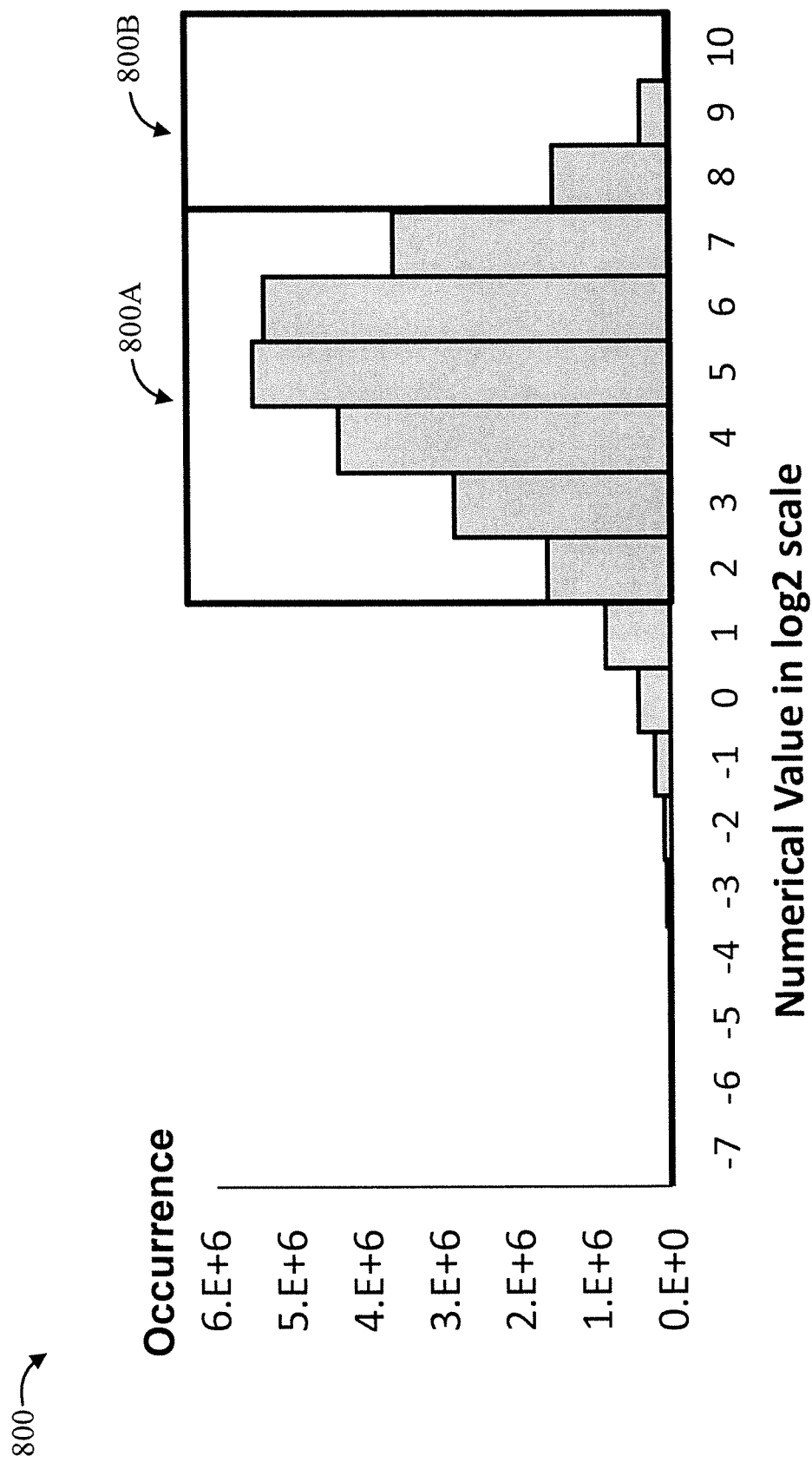
FIG. 8 is a diagram showing an exemplary modified version of the distribution of FIG. 6 resulting from application of a delta rule, in accordance with an embodiment of the present invention.

FIG. 7 is a diagram showing an exemplary distribution 700 to which the present invention can be applied, in accordance with an embodiment of the present invention. FIG. 8 is a diagram showing an exemplary modified version 800 of the distribution 700 of FIG. 7 resulting from application of a delta rule 810, in accordance with an embodiment of the present invention.

In FIG. 7, the precision is WL=6 using a non-bi-modal format. The format is as follows: [IB=9, FB=-3].

Thus, in the modified data distribution 800, portion 800A corresponds to the low range mode, and portion 800B corresponds to the high range mode. The format for the low range is as follows: [IB=9-δ, FB=-3+δ]. Respective values of delta δ having opposing signs are used for integer bits and fractions bits, respectively.

Thus, the delta rule 810 involves shifting some distributions by a positive value of a shift amount and shifting other distributions by a negative value of the shift amount.

Figure 9:
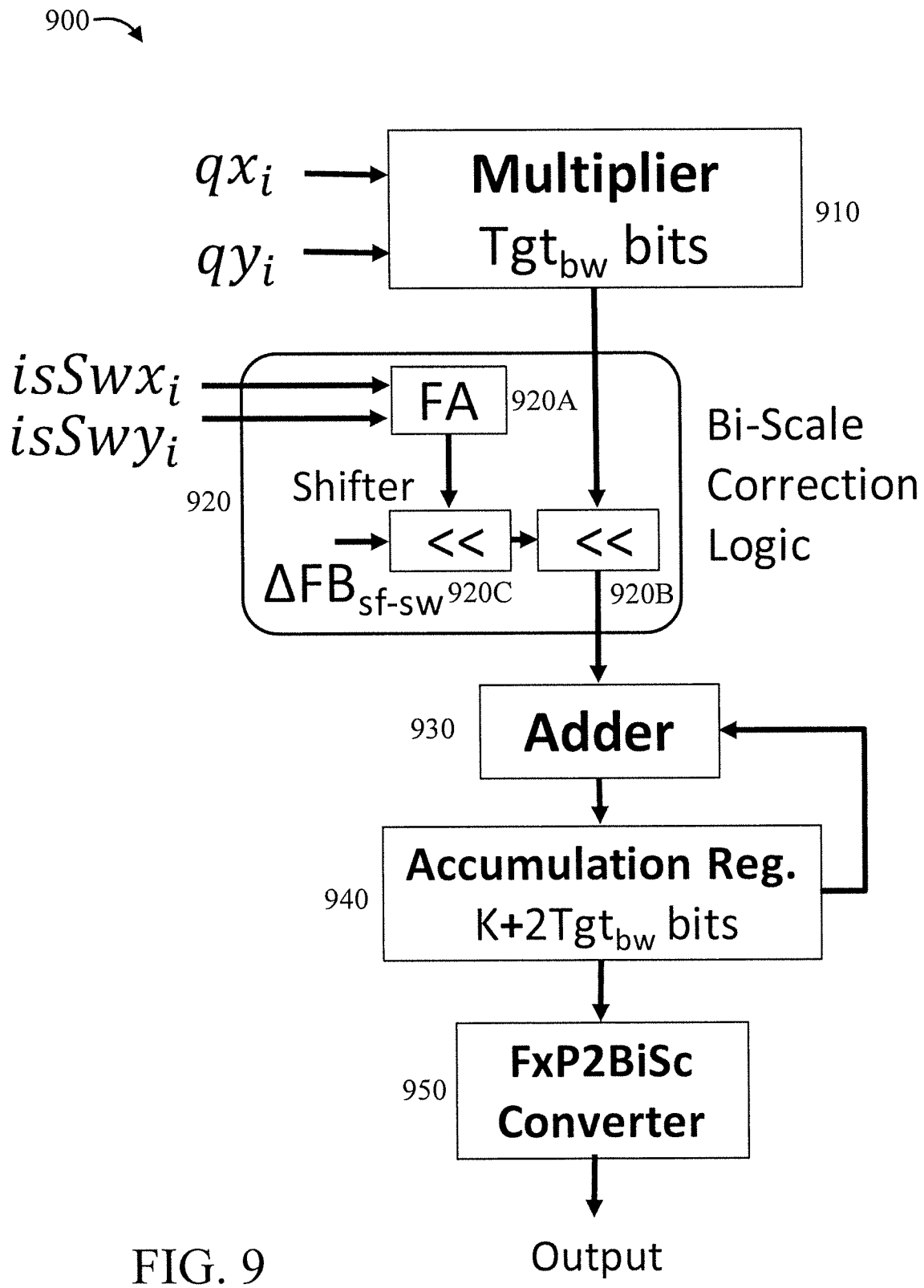
FIG. 9 is a block diagram showing an exemplary bi-scale processing element, in accordance with an embodiment of the present invention.

FIG. 9 is a block diagram showing an exemplary bi-scale processing element 900, in accordance with an embodiment of the present invention.

The bi-scale processing element 900 includes a multiplier 910, a bi-scale correction logic 920, an adder 930, an accumulation register 940, and a conversion unit 950. It computes the dot product of two tensors, both of which are quantized in bi-scaled representation.

The multiplier 910 is for multiplying $Tgt_{bw}$ bits of input operands ($qx_i$ and $qy_i$), which are quantized using at least 2 scale factors called scale-fine (sf) and scale-wide (sw). The first mode, scale-fine, corresponds to enhanced resolution and the second mode, scale-wide, corresponds to enhanced range. The advantage of bi-scaled quantization is that $Tgt_{bw}$ can be made smaller compared to conventional quantization methods where only one scale-factor is used. This leads to an overall reduction in the power of the bi-scaled processing element, as power consumed in multipliers is known to decrease quadratically with the bit-width of its input operands.

The bi-scale correction logic 920 is used to correct the multiplier output when any one of its operands is quantized in the scale-wide (sw) mode. The bi-scale correction logic takes two inputs $isSwx_i$ and $isSwy_i$, which denote if input operands $qx_i$ and $qy_i$ were quantized using scale-wide mode respectively. Inputs to the bi-scale correction logic can be provided in any of the following ways: (1) indicator at place, that is, a 1-bit extension to the numbers (see, e.g. FIG. 10); (2) separate vector of 1-bit (see, e.g., FIG. 11; and (3) table-based (see, e.g., FIG. 12). The bi-scale correction logic 920 includes a full adder (FA) 920A and a shifter 920B. The bi-scale correction logic 920 also has a register 920C which is pre-loaded with the difference ($\Delta FBsf_{-sw}$) in resolution between the scale-fine and scale-wide modes. The shifter 920B is used to correct the multiplier output by shifting left by $(isSwx_i + isSwy_i) * \Delta FB_{sf-sw}$.

The adder 930 is for adding bits from the output of the bi-scale correction logic 920 with the accumulator register 940.

The accumulation register 940 includes $K+2*Tgt_{bw}$ bits for the purpose of storing the partial sum as the dot-products across multiple cycles using the bi-scale correction logic 920. The adder 930 and accumulation register 940 provide a linear savings in power as $Tgt_{bw}$ can be made smaller with bi-scaled representation as opposed to conventional quantization methods.

The FxP2BiSc conversion unit (also referred to as "converter") 950 is for converting the value in the accumulator register 940 into a bi-scaled representation. The FxP2BiSc conversion unit 950 is used sporadically at the end of the dot-product computation. Based on the magnitude of the value in the accumulator register 940, the FxP2BiSc conversion unit 950 uses a shifter to quantize to the correct resolution based on whether scale-fine or scale-wide is appropriate.

A description will now be given regarding 3 exemplary ways of realizing a bi-scaled switch, shown in FIGS. 10, 11, and 12, for feeding inputs—$isSwx_i$ and $isSwy_i$—to the bi-scale correction logic 920, in accordance with various embodiments of the present invention.

Figure 10:
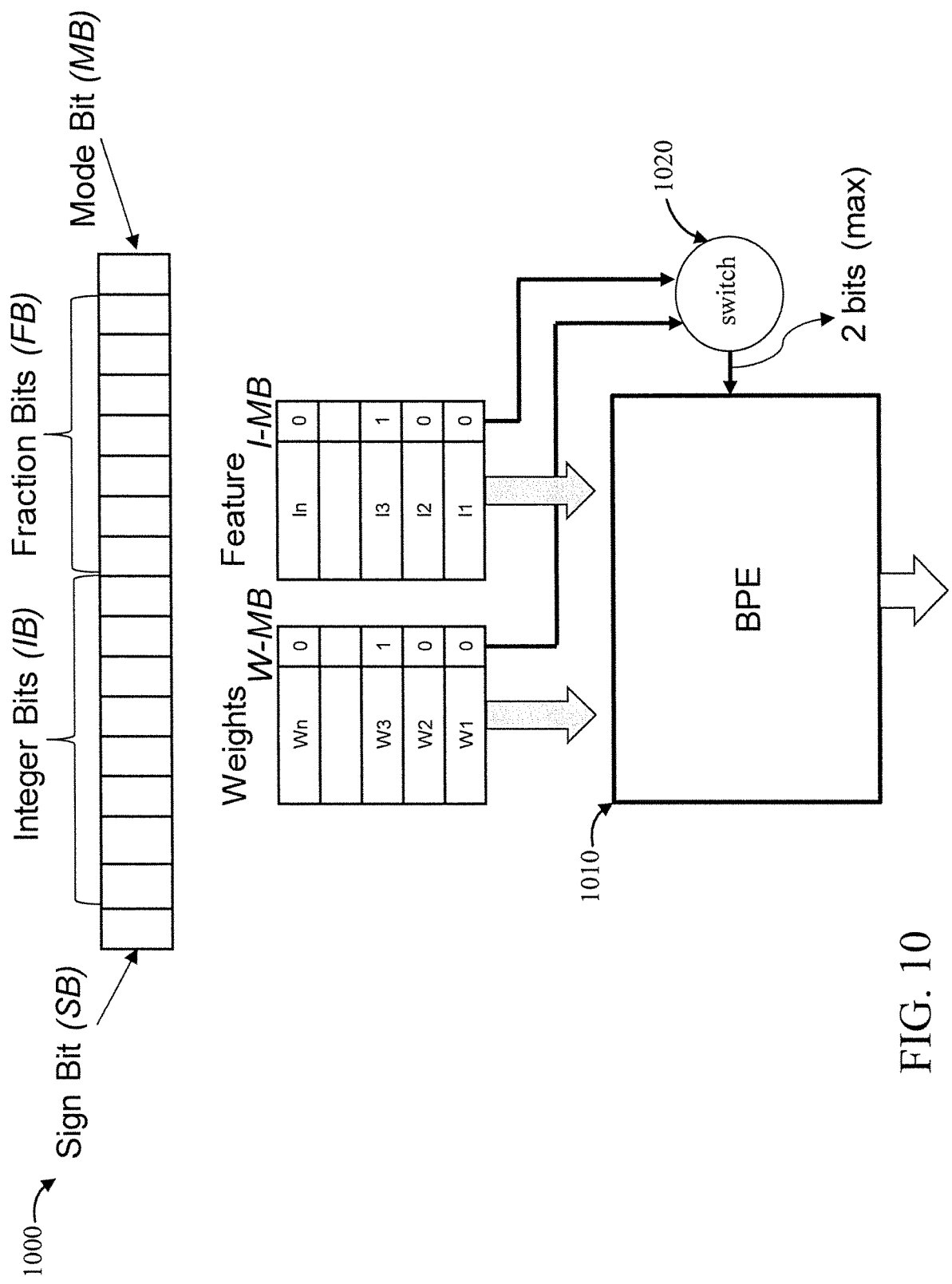
FIG. 10 is a block diagram showing an exemplary indicator for realizing a bi-scaled switch, in accordance with an embodiment of the present invention.

FIG. 10 is a block diagram showing an exemplary indicator 1000 for realizing a bi-scaled switch, in accordance with an embodiment of the present invention.

A Bi-scale Processing Element (BPE) 1010 receives a set of features ($l_1$ through $l_n$) and a set of weights ($w_1$ through $w_n$) and for the features, from a data representation having a sign bit, a set of Integer Bits (IBs), a set of Fraction Bits (FBs), and a mode bit (MB).

The bi-scaled switch collects the Weight Mode Bit (W-MB) and feature Mode Bit (I-MB) as passes them to the bi-scale correction logic. The two bits are used to indicate which of the two possible modes were used in quantizing the weights and features.

Figure 11:
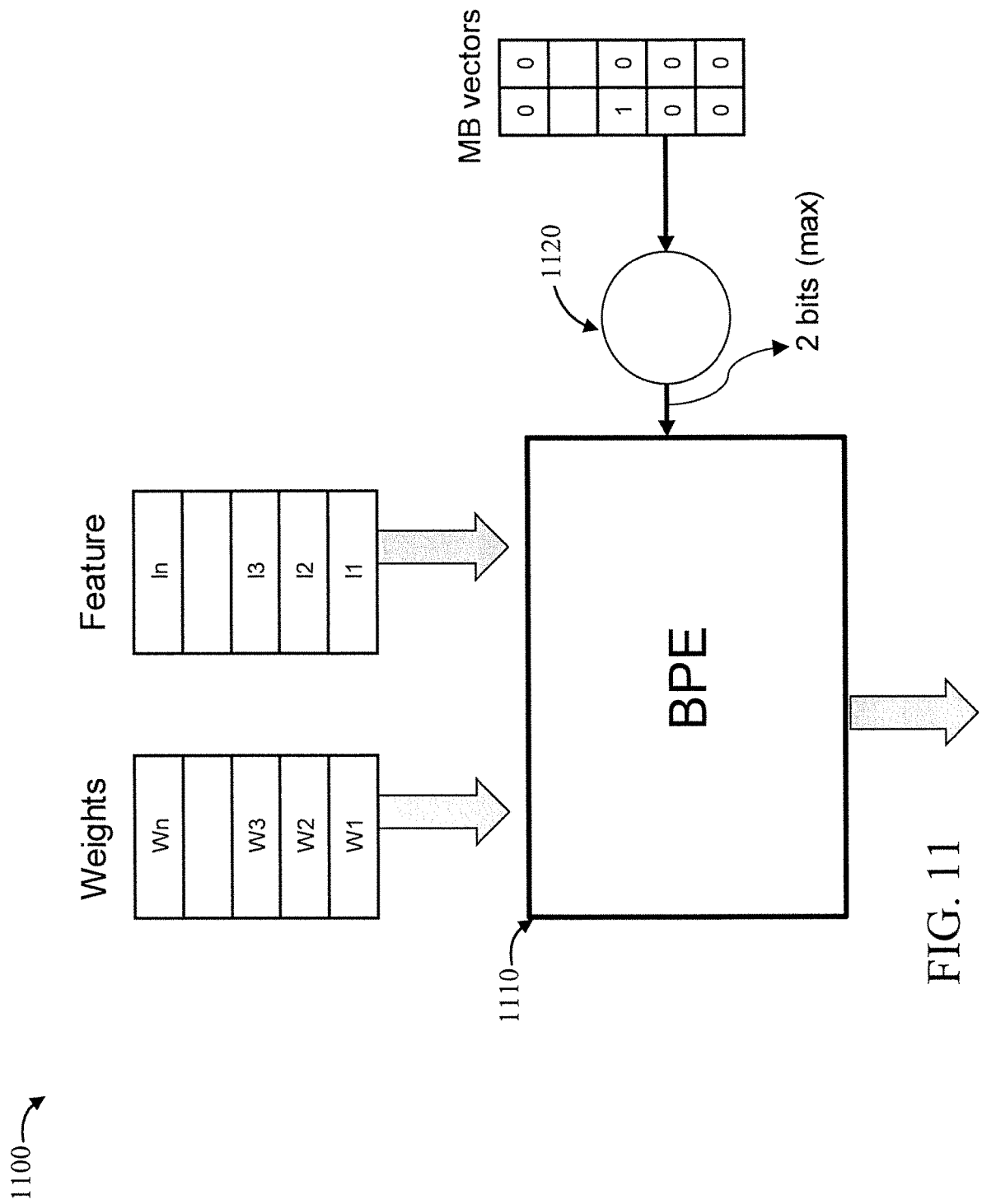
FIG. 11 is a block diagram showing an exemplary separate 1-bit vector for realizing a bi-scaled switch, in accordance with an embodiment of the present invention.

FIG. 11 is a block diagram showing an exemplary separate 1-bit vector 1100 for realizing a bi-scaled switch, in accordance with an embodiment of the present invention.

A Bi-scale Processing Element (BPE) 1110 receives a set of features ($l_1$ through $l_n$) and a set of weights ($w_1$ through $w_n$) for the features.

A bi-scaled switch 1120 outputs 2 bits max to the BPE 1010 responsive to receiving weight Mode Bit (W-MB) and Feature Model Bit (F-MB) vectors stored as separate 1 bit vectors.

Figure 12:
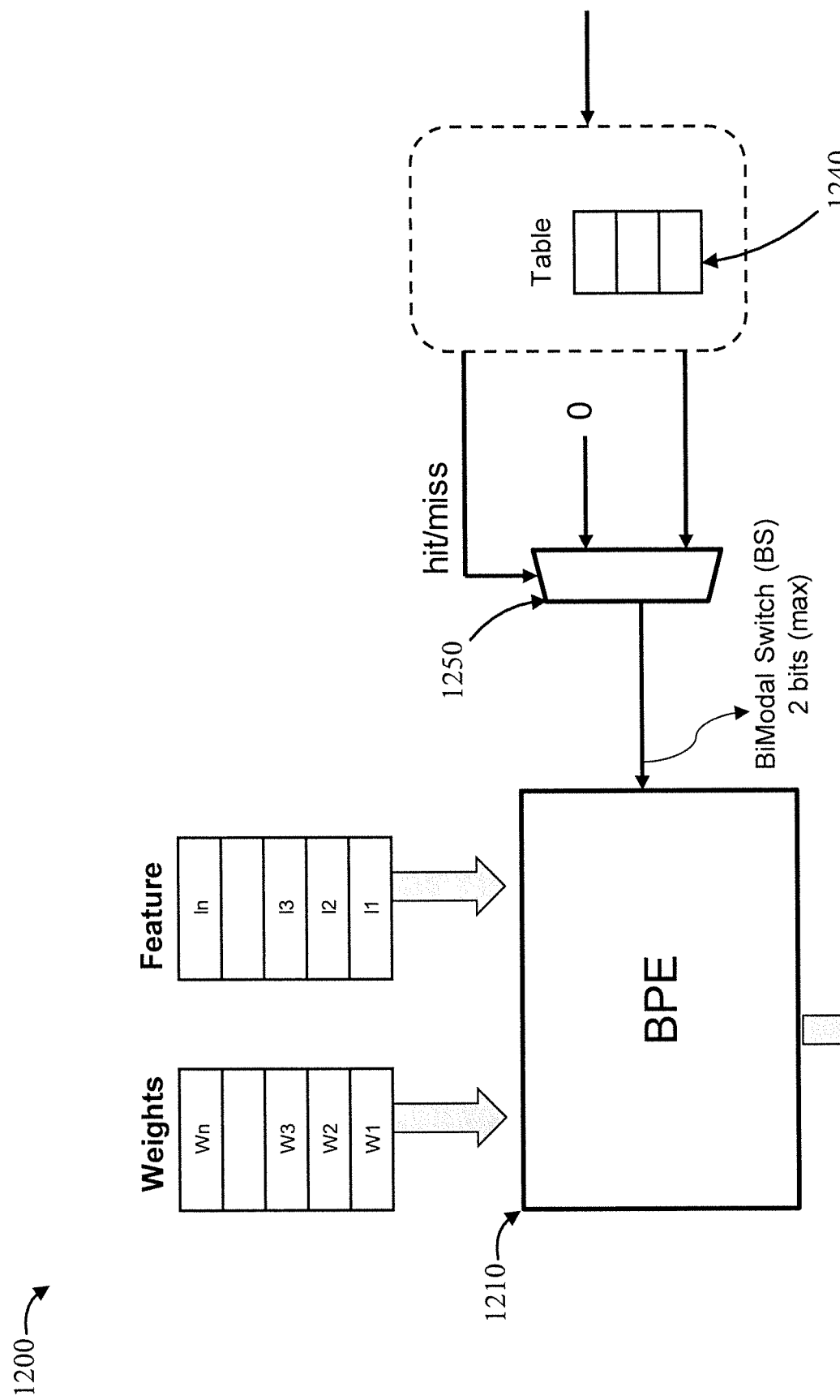
FIG. 12 is a block diagram showing an exemplary table based approach for realizing a bi-scaled switch, in accordance with an embodiment of the present invention.

FIG. 12 is a block diagram showing an exemplary table based approach 1200 for realizing a bi-scaled switch, in accordance with an embodiment of the present invention.

A Bi-scale Processing Element (BPE) 1210 receives a set of weights ($w_1$ through $w_n$) and a set of features ($l_1$ through $l_n$) for the weights.

A bi-scaled switch 1250, where the weight Mode Bit (W-MB) and Feature Model Bit (F-MB) vectors are stored in a table in block-sparse format. The sparse vector contains only the indices of the elements quantized in scale-wide mode. If the index processed by the BPE is present in the table, then the bi-modal switch selects a 1 or a 0 using a multiplexor and feeds it to the bi-scale correction logic. This process is performed simultaneously on both the weight mode bit and the feature mode bit sparse vectors in the bi-scaled switch.

A further description will now be given regarding various aspects of the present invention.

One or more embodiments of the present invention provide BISCALED-FXP, a new number representation suited for long-tailed data structures. Embodiments of the present invention can use the same number of bits to represent both small and large values but use two different scale factors in their quantization. Elements of small magnitude are quantized with sufficient resolution using the smaller of two scale factors, which we call scale-fine. On the other hand, larger elements use a different scale factor, called scale-wide, which covers the entire range of values in the data structure. Thus, through the use of two scale-factors, BISCALED-FXP achieves the best of both worlds; it minimizes quantization errors in small numbers and simultaneously eliminates saturation of large values.

Computing on BISCALED-FXP tensors requires the following. First, the scale factor used in quantizing each element needs to be stored in addition to the values themselves. Instead of using an extra bit for each element, we leverage the fact that the fraction of elements in the tail of the data structure are very small. Therefore, we use a sparse format to store only the indices of the elements quantized with scale-wide, making the memory overheads negligible. Next, if the operands to a computation use different scale factors then its result needs to be scaled. For example, in Multiply and Accumulate (MAC) operation (>99% of ops in DNNs) if one or both operands use scale-wide, the multiplier output needs to be shifted left before accumulation. As BISCALEDFXP fosters reduction in bit-width, the near quadratic benefits in the multiplier far outweighs the shift overhead.

A further description will now be given regarding long-tailed data structures, in accordance with one or more embodiments of the present invention.

A prominent trait of DNN data structures (weights and activations) is the existence of a long-tail in their value distribution. It has been found that typically a majority of the elements are of small magnitude, which mandates fine resolution in the representation. We also find the distribution has a long tail with its range often spanning orders of magnitude. In illustrative, non-limiting embodiment, we quantify the tail length as the log ratio of the maximum value to the 90th percentile value in the distribution. As an example, consider a tail length to be 2.9. Intuitively, this indicates that, to capture just the last 10% of the values, we require 3 additional integer bits in the representation. This behavior is typical of almost all data structures across different layers and networks.

A description will now be given regarding biscaled-FXP number representation, in accordance with one or more embodiments of the present invention.

To effectively represent long-tailed data distributions, we propose a new number representation called BISCALED-FXP. One approach is to selectively use higher bit-width to represent large magnitude elements. However, the use of larger bit-width is superfluous for those elements and as they may be spread across the entire data structure, it makes computations irregular and demands support for variable precision execution in hardware. Therefore, in BISCALED-FXP, we maintain the same computation bit-width for all elements. Instead, the key idea is to use two different scale factors in their quantization. We call the two scale factors scale-fine and scale-wide. As the names imply, scale-fine provides finer resolution but only a limited range which suits quantization of elements with small magnitude. Scale-wide yields a wide range to cover even the largest element. However, they are represented at a coarser resolution which is tolerable in their case. Thus, based on the magnitude of the element, BISCALED-FXP uses the right scale factor in its quantization, while maintaining the same bit-width for all elements.

BISCALED-FXP representation can be defined using 4 parameters—$IB_{sf}$, $FB_{sf}$, $IB_{sw}$, $FB_{sw}$—that indicate the integer and fractional bits of scale-fine and scale-wide respectively. Elements that lie within the range of scale-fine ($\pm 2^{IB_{sf}}$) are quantized using scale-fine, while those that fall outside scale-fine's range use scale-wide. It is noteworthy that of the 4 parameters only the integer ($IB_{sf}$ and $IB_{sw}$) bits are independent parameters. Given the target bit-width ($Tgt_{bw}$), the fractional bits ($FB_{sf}$ and $FB_{sw}$) can be computed as $FB=Tgt_{bw}-IB-1$. Further, by analyzing the value distribution of a data structure the range of scale-wide ($IB_{sw}$) can be ascertained. Since scale-wide needs to cover even the largest element in the data structure, $IB_{sw}$=ceil $\{\log_2(\max \text{element})\}$. However, identifying the range of scale-fine ($IB_{sf}$) requires the use of heuristics described herein.

A description will now be given regarding a bi-scaled tensor representation, in accordance with one or more embodiments of the present invention.

Based on the BISCALED-FXP representation, we construct a BiScaled tensor for a given data structure, which includes the necessary metadata useful for computations. The biscaled tensor comprises of 4 components: (i) quantized data elements; (ii) scale factor (fine vs. wide) for quantizing each element; (iii) shape of the tensor i.e., size of each tensor dimension; and (iv) integer and fractional bits in scale-fine and scale-wide.

BISCALED-FXP incurs an overhead in storing the scale factor used for quantizing each element of the data-structure. To quantify this overhead, we define an Effective Bit Width (EBW) to represent each element in BISCALED-FXP as follows:

$$EBW = \frac{MemReqd_{data\ values} + MemReqd_{scale\ factor}}{\text{Total Elements}} \quad (1)$$

As shown in Equation 1, EBW is given by the total memory required to store the data values and the scale factor used in quantizing each element divided by total number of elements in the data structure.

A description will now be given regarding the dot-product of biscaled tensors, in accordance with an embodiment of the present invention.

A dot-product or Multiply-and-Accumulate (MAC) operation occupies >99% of computation time and energy in DNNs. We note describe how dot-product operation can be performed on two BiScaled tensors. Let $bx_i$ and $by_i$ denote quantized data values in the BiScaled tensors BX and BY. Based on the indices of the scale-wide elements in the BiScaled tensor, we construct two 1-bit entities, $isSwx_i$ and $isSwy_i$, which indicate if $bx_i$ and $by_i$ were quantized using scale-wide respectively. The key is that for each operand that uses scale-wide quantization, the multiplication output needs to be shifted by the difference in resolution between scale-fine and scale-wide (FBsf−FBsw) before accumulation. Since a vast majority of elements are quantized using scale-fine, the shifter logic is inactive in most computation cycles. Therefore, the energy overheads in the shift operation are significantly outweighed by the energy benefits in the multiplier, memory accesses and bandwidth due to fewer computation bits used in BISCALED-FXP.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for forming a Deep Neural Network (DNN), comprising:
    quantizing, by a hardware processor, deep learning data structures of the DNN into at least two modes using at least two scale factors, respectively, wherein each of the at least two modes corresponds to a respective one of the at least two scale factors; and identifying, by the hardware processor, which of the at least two scale factors to use for a given one of the data structures based on a data distribution of the given one of the data structures, wherein said quantizing step comprises identifying when a tail of the given one of the data structures starts by (i) building a histogram of values in the given one of the data structures using successive bins;

(ii) identifying a ratio of density between the successive bins; and (iii) checking whether the ratio of density is greater than a ratio of density threshold.

2. The computer-implemented method of claim 1, wherein the at least two modes comprise fixed-point modes.

3. The computer-implemented method of claim 1, wherein the at least two modes comprise a first mode for large numbers greater than a large number threshold and a second mode for small numbers less than a small number threshold, wherein the first mode provides more range for the large numbers than the second mode, and wherein the second mode provides more resolution for the small numbers than the first mode.

4. The computer-implemented method of claim 1, further comprising selecting between the at least two scale factors to selectively balance a quantization range and a quantization resolution.

5. The computer-implemented method of claim 1, further comprising indicating which of the at least two modes is used for the given one of the data distributions using a 1-bit extension to the given one of the data distributions.

6. The computer-implemented method of claim 1, further comprising indicating which of the at least two modes is used for the given one of the data distributions using a separate 1-bit vector relative to the given one of the data distributions.

7. The computer-implemented method of claim 1, further comprising indicating which of the at least two modes is used for the given one of the data distributions using a table.

8. The computer-implemented method of claim 1, wherein the at least two modes comprise a low range mode and a high range mode having a higher range than the low range mode.

9. The computer-implemented method of claim 8, wherein said identifying step comprises applying a percentile rule that assigns any distributions (i) below a given percentile threshold to the low range mode and (ii) above the given percentile threshold to the high range mode.

10. The computer-implemented method of claim 8, wherein said identifying step comprises applying a ratio rule that assigns any distributions (i) below a given ratio threshold to the low range mode and (ii) above the given ratio threshold to the high range mode, wherein the given ratio threshold is determined relative to a distribution boundary calculated from a percentage ratio, the percentage ratio corresponding to a given and an immediately following one of the distributions.

11. The computer-implemented method of claim 8, wherein said identifying step comprises applying a delta rule that shifts (i) some of the distributions by a positive value of a shift amount corresponding to the low range mode and (ii) other ones of the distributions by a negative value of the shift amount corresponding to the high range mode.

* * * * *